United States Patent
Costantini et al.

(10) Patent No.: US 9,553,881 B2
(45) Date of Patent: Jan. 24, 2017

(54) SECURITY MONITORING FOR OPTICAL NETWORK

(75) Inventors: Matteo Costantini, Genoa (IT); Roberto Magri, Parma (IT)

(73) Assignee: TELEFONAKTIEBOLAGET LM ERICSSON (publ), Stockholm (SE)

(*) Notice: Subject to any disclaimer, the term of this patent is extended or adjusted under 35 U.S.C. 154(b) by 0 days.

(21) Appl. No.: 14/405,338

(22) PCT Filed: Jun. 11, 2012

(86) PCT No.: PCT/EP2012/060996
§ 371 (c)(1),
(2), (4) Date: Mar. 30, 2015

(87) PCT Pub. No.: WO2013/185797
PCT Pub. Date: Dec. 19, 2013

(65) Prior Publication Data
US 2015/0135319 A1     May 14, 2015

(51) Int. Cl.
*G06F 21/00*  (2013.01)
*H04L 29/06*  (2006.01)
(Continued)

(52) U.S. Cl.
CPC .......... *H04L 63/1416* (2013.01); *H04B 10/85* (2013.01); *H04J 14/0227* (2013.01);
(Continued)

(58) Field of Classification Search
CPC ................................................ H04L 63/1416
See application file for complete search history.

(56) References Cited

U.S. PATENT DOCUMENTS 6,404,525 B1 *  6/2002  Shimomura ........... H04B 10/03
                                                                    398/82
7,130,538 B2 * 10/2006  Wetzel ............... H04Q 11/0005
                                                                    398/43
(Continued)

FOREIGN PATENT DOCUMENTS

| CN | 1169813 A | 1/1998 |
| CN | 1679258 A | 10/2005 |
| WO | 2011/103930 A1 | 9/2011 |

OTHER PUBLICATIONS

PCT International Search Report, mailed Jan. 21, 2013, in connection with International Application No. PCT/EP2012/060996, all pages.
(Continued)

*Primary Examiner* — Morshed Mehedi
(74) *Attorney, Agent, or Firm* — Leffler Intellectual Property Law, PLLC (57) ABSTRACT

Apparatus for an optical communications network has optical paths for optical traffic, and optical ports, one of which is an unused output port. A security monitoring system has a blocking part coupled removably to the unused output port to occupy it to prevent unauthorized access. An optical detector can detect optical signals passing through the unused output port to the blocking part, and there is alarm circuitry configured to output an alarm signal based on the detecting of the optical signals. This monitoring can help make the node more secure from interference or from eavesdropping. By blocking the port, the monitoring can be independent of the type of signals on the optical paths. The system can be passive or active, and does not require a change in the installed node configuration and so can be added easily to existing infrastructure.

16 Claims, 11 Drawing Sheets

(51) Int. Cl.
*H04J 14/02* (2006.01)
*H04Q 11/00* (2006.01)
*H04B 10/85* (2013.01)
*H04J 14/04* (2006.01)

(52) U.S. Cl.
CPC ...... *H04Q 11/0062* (2013.01); *H04J 14/0204* (2013.01); *H04J 14/0209* (2013.01); *H04J 14/0212* (2013.01); *H04J 14/04* (2013.01); *H04Q 2011/0079* (2013.01); *H04Q 2011/0083* (2013.01)

(56) References Cited

U.S. PATENT DOCUMENTS

| | | | | |
|---|---|---|---|---|
| 7,620,212 B1* | 11/2009 | Allen | ............... | G06K 9/0004 340/5.53 |
| 2004/0120706 A1* | 6/2004 | Johnson | ............... | H04B 10/07 398/10 |
| 2005/0185895 A1* | 8/2005 | Keenum | ............... | G02B 6/4477 385/76 |
| 2006/0160395 A1* | 7/2006 | Macauley | ............... | H04Q 1/136 439/344 |
| 2007/0289017 A1* | 12/2007 | Copeland, III | ....... | G06F 21/552 726/23 |
| 2009/0172474 A1* | 7/2009 | Negrete | ............... | H04L 41/0681 714/37 |
| 2009/0237778 A1* | 9/2009 | Onaka | ............... | H04B 10/0731 359/334 |
| 2012/0162747 A1* | 6/2012 | Kim | ............... | G02F 1/2255 359/326 |

OTHER PUBLICATIONS

Furdek, M. et al. "Physical-layer attacks in all-optical WDM networks" 2011 Proceedings of the 34th International Convention MIPRO, IEEE, May 23, 2011, pp. 446-451, XP031904313, ISBN: 978-1-4577-0996-8.

Rejeb, R. et al. "Fault and attack management in all-optical networks" IEEE Communications Magazine, IEEE Service Center, Piscataway, NJ, US, vol. 44, No. 11, Nov. 1, 2006, pp. 79-86, XP011143578, ISSN: 0613-6804.

Medard, M. et al. "Security Issues in All-optical Networks" IEEE Network, IEEE Service Center, New York, NY, US, vol. 11, No. 3, May 1, 1997, pp. 42-48, XP000689789, ISSN: 0890-8044.

Jung et al. "Demonstration of 10Gbps all-optical encryption and decryption system utilizing SOA XOR logic gates", Optical and Quantum Electronics, vol. 40, No. 5-6, Apr. 2008, pp. 425-430.

ITU-T Recommendation X.805 "Security architecture for systems providing end-to-end communications" Oct. 2003, pp. 1-28.

Chinese Office Action, issued Feb. 29, 2016, in connection with Chinese Application No. 201280073879.1, all pages.

English language translation of Chinese Office Action, issued Feb. 29, 2016, in connection with Chinese Application No. 201280073879.1, all pages.

* cited by examiner

SECURITY MONITORING FOR OPTICAL NETWORK

TECHNICAL FIELD

This invention relates to security monitoring systems for optical networks, to apparatus having such systems, and to corresponding methods of monitoring security, and of installing security monitoring systems.

BACKGROUND

As the demand for network capacity grows, the issue of securing the physical layer of optical network cannot be overlooked. Optical layer security benefits from electromagnetic immunity however the optical layer includes not only fiber spans but also network equipments which are vulnerable to a variety of attacks. This means that optical networks can be almost as easy to tap or to interfere as copper wire based networks.

One approach that has been proposed for providing communications security is optical encryption of the signals transmitted across an optical communications network, as proposed by Jung et al, "Demonstration of 10 Gbps all-optical encryption and decryption system utilizing SOA XOR logic gates", Optical and Quantum Electronics, vol. 40, no. 5-6, April 2008. A problem faced by optical encryption is that optical encryption and decryption devices are required for each wavelength channel at each transmitter and receiver within a communications network, raising the cost of the network.

One known approach shown in WO2011103930 is concerned with the vulnerability of optical monitoring points in the communications network. These monitoring points are intended for monitoring optical spectrum and power but may be vulnerable to unauthorised eavesdropping. They typically comprise an optical splitter arranged to extract between 1% and 10% of the optical signal that is to be monitored, the extracted signal being provided to a monitoring port. All of the traffic carried by the optical signal being monitored is replicated in the extracted signal and is provided to the monitoring port. There is a resulting problem that live traffic is vulnerable to eavesdropping at the monitoring port and this presents a problem of communications network security.

International Telecommunications Union document ITU-T X.805 "Security architecture for systems providing end-to-end communications" sets out various optical protection schemes for making an optical connection secure against a fibre being cut to place an in-line tap for eavesdropping. However, the methods set out in ITU-T X.805 only monitor cuts in an optical communications network fibre link and are not able to detect eavesdropping of an optical signal via a monitoring port.

Optical signal transforming apparatus is arranged to receive the tapped signal and to apply an optical transfer function to the tapped signal to form an optical monitoring signal. The optical transfer function is arranged to preserve the spectral property of the tapped signal and to apply a time-domain obfuscation to the tapped signal. The optical signal transforming apparatus is further arranged to provide the optical monitoring signal to the monitoring port. Thus an optical monitoring signal from an input optical signal or an output optical signal may be formed on which the traffic is obfuscated in the time-domain and in which a spectral property of the input optical signal or the output optical signal is preserved. Therefore it becomes difficult or impossible for traffic on the input signal or the output signal to be intercepted by eavesdropping on the optical monitoring signal, without the need for encryption of each wavelength channel.

SUMMARY

According to a first aspect of the invention there is provided apparatus for an optical communications network, the apparatus having at least two optical paths for optical traffic to or from other nodes, the optical paths having respective optical ports, wherein at least one of the optical ports is configured as an unused output port, available for coupling optical traffic in the future. A security monitoring system is provided for detecting unauthorised access and having a blocking part coupled removably to the unused output port to occupy the unused output port so as to exclude any other part from using the unused output port to gain unauthorised access to the optical path of the unused output port. An optical detector is coupled to the blocking part and configured to detect optical signals passing through the unused output port. Alarm circuitry is provided, configured to output an alarm signal indicative that the unused output port has been accessed based on the detecting of the optical signals by the optical detector. This monitoring can help make the node more secure from interference or from eavesdropping. By blocking the port, the monitoring can be independent of the type of signals on the optical paths and so can be easier to implement than other methods such as encrypting the signals transmitted, or modifying the signals to obscure the traffic before they are output to monitoring outputs. Nevertheless, by detecting tampering using the actual output optical path used for the optical traffic, it can be more sensitive to tampering than other methods of blocking access to the unused output ports. the optical detector being configured to sense output optical signals on the at least one unused output port, and the alarm circuitry being arranged to output the alarm signal based on the detecting of the output optical signals by the optical detector. This enables the detection to be based on the output optical traffic. It also enables the monitoring system to be external or more independent of the rest of the node, making it easier to upgrade existing nodes. Compared to other mechanical or physical security measures applied to the entire node or building, this can be simpler, less costly and can be applied selectively so as to secure just part of a node as desired. The novel monitoring is also compatible with such known methods and can thus enable security to be provided at multiple levels for more complete security. These distinctions apply in principle to both internally accessible or external ports, and to any way of making use of the resulting tampering indication. See FIG. 1 for example.

Any additional features can be added to these features, and some such additional features are set out below and set out in dependent claims and described in more detail. One such additional feature is the alarm circuitry being configured to output the alarm signal if a break in the optical signals is sensed. This is one way of making the detection, others can be envisaged. See FIG. 3 for example.

Another such additional feature is the node comprising at least one of an optical splitter having an output coupled to the unused output port, and a wavelength demultiplexer having an output coupled to the unused output port. These are commonly used components which can result in spare outputs, which therefore can give rise to security vulnerabilities, see FIGS. 8 and 9 for example.

Another such additional feature is the at least one unused output port comprising an optical connector, and the blocking part having a corresponding connector suitable to mate with the optical connector to couple the optical path of the unused output port with the optical detector. The connector makes it particularly easy to eavesdrop, so in this case the added security is particularly useful. See FIG. 4 for example.

Another such additional feature is the monitoring system having a communications part for sending the alarm signal to a network management part of the network. This can help enable an appropriate response to the detection as the network management system has much information about the state of the network. See FIG. 5 for example.

Another such additional feature is the alarm circuitry having a latching circuit configured to maintain a persistent indication of a temporary detection of tampering, and a reset circuit for resetting the latching circuit according to an external signal. This can help enable the handling of transient detections. See FIG. 6 for example.

Another aspect of the invention provides a security monitoring system for coupling to an unused output port of an optical path of apparatus of an optical network, the apparatus having at least two optical paths for optical traffic to or from other nodes, the optical paths having respective optical ports, wherein at least one of the optical ports is configured as an unused output port, available for coupling optical traffic in the future. The security monitoring system is for detecting unauthorised access and has a blocking part for coupling with the unused output port so as to occupy the unused output port. An optical detector is coupled to the blocking part and configured to detect optical signals passing through the unused output port. Alarm circuitry is provided configured to output an alarm signal indicative that the unused output port has been accessed, based on the detecting of the optical signals by the optical detector. Having the monitoring part as an external part is particularly useful to enable use with existing nodes, and to enable use with different types of nodes for example without needing to alter the nodes.

Another such additional feature is the alarm circuitry being configured to output the alarm signal if a break in the optical signals is sensed. See FIG. 3 for example.

Another such additional feature is a communications part for sending the alarm signal to a network management part of the network. See FIG. 5 and FIG. 7 for example.

Another such additional feature is the alarm circuitry having a latching circuit for maintaining a persistent indication of a detection, and a reset circuit for resetting the latching circuit according to an external signal. See FIG. 6 for example.

Another such additional feature is where there are two or more of the blocking parts, for two or more respective unused output ports, the alarm circuitry is configured to output an alarm signal indicating which of the two or more unused output ports has been accessed. This can help in enabling security to be handled on a per port basis, or per group of ports. Thus an alarm indication for one port need not affect all traffic through a node, and thus unnecessary rerouting of traffic can be reduced, and a more detailed picture of security level along a path can be built up. See FIG. 11 for example.

Another such additional feature is where there are two or more blocking parts, for two or more respective unused output ports and the alarm circuitry being configured to combine outputs of the optical detectors to output a common alarm signal if access to any of the two or more unused output ports is detected. This combining can help reduce the numbers of signals and simplify the arrangement, which can make it more scalable to systems having many unused output ports or many nodes. See FIG. 10 for example.

Another aspect of the invention provides a method of monitoring security of an optical path to detect unauthorised access to the optical path in apparatus of an optical network, the apparatus having at least two optical paths for optical traffic to or from other nodes, the optical paths having respective optical ports, wherein at least one of the optical ports is configured as an unused output port, available for coupling optical traffic in future. There are steps of blocking the at least one unused output port so as to exclude any other part from using the unused output port to gain unauthorised access to the optical path of the unused output port, detecting optical signals on the optical path of the unused output port, and outputting an alarm signal indicating whether access has occurred based on the detecting of the optical signals by the optical detector. See FIG. 2 for example.

Another additional feature is the step of sensing if a break in the optical signals is detected, and outputting the alarm signal according to the sensing. See FIG. 3 for example.

Another such additional feature is a step of sending the alarm signal to a network management part of the network. See FIG. 7 or FIG. 10 for example.

Another aspect of the invention provides a method of installing a security monitoring system to upgrade apparatus of an optical communications network, the apparatus having at least two optical paths for optical traffic to or from other parts of the network, and having two or more optical ports, wherein at least one of the optical ports is configured as an unused output port, available for coupling optical traffic in future. The security monitoring system is for detecting unauthorised access and has a blocking part suitable to couple removably to the at least one unused output port to occupy the unused output port so as to exclude any other part from using the unused output port to gain unauthorised access to the optical path of the unused output port. There is an optical detector coupled to the blocking part and configured to detect optical signals passing through the unused output port, and alarm circuitry configured to output an alarm signal indicative that the unused output port has been accessed based on the detecting of the optical signals by the optical detector. The method of installing the security monitoring system has the steps of coupling the blocking part of the security monitoring system to the unused output port, and providing a communication path for the circuitry of the security monitoring system to communicate the indication to a network management system of the network.

The ability to add monitoring with minimal changes to existing hardware or software of a node is a useful benefit, and makes it an easy upgrade. Hence this claim explicitly covers the upgrading steps without reciting operating steps, nor being limited to a node. See FIG. 7 for example.

Any of the additional features can be combined together and combined with any of the aspects or be disclaimed from any of the aspects. Other effects and consequences will be apparent to those skilled in the art, especially over compared to other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

Embodiments of the invention will be described, by way of example only, with reference to the accompanying drawings in which.

DETAILED DESCRIPTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes.

ABBREVIATIONS

AD: Analog to Digital Converter
AWG: Array WaveGuide
HW: Hardware
LC Lucent type Connector
LOS: Loss of Signal
MTP: Multi-fiber Termination Push-on (type of connector)
ROADM: Reconfigurable Optical Add Drop Multiplexer
WDM Wavelength Division Multiplexed
WSON Wavelength Switched Optical Network
WSS: Wavelength Selective Switch

DEFINITIONS

Where the term "comprising" is used in the present description and claims, it does not exclude other elements or steps and should not be interpreted as being restricted to the means listed thereafter. Where an indefinite or definite article is used when referring to a singular noun e.g. "a" or "an", "the", this includes a plural of that noun unless something else is specifically stated.

Elements or parts of the described nodes or networks may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to nodes can encompass any kind of switching node, not limited to the types described, not limited to any level of integration, or size or bandwidth or bit rate and so on.

References to switches can encompass switches or switch matrices or cross connects of any type, whether or not the switch is capable of processing or dividing or combining the data being switched.

References to programs or software can encompass any type of programs in any language executable directly or indirectly on processing hardware.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

The functionality of circuits or circuitry described herein can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Embodiments can have programs in the form of machine-readable instructions (software) which, when executed by a processor, perform any of the described methods. The programs may be stored on an electronic memory device, hard disk, optical disk or other machine-readable storage medium or non-transitory medium. The programs can be downloaded to the storage medium via a network connection.

References to ports are intended to encompass any kind of port, examples include, and are not limited to, optical connectors for internal or external coupling, connectors for coupling between cards and motherboards, fiber tails with no termination, for future splicing, cards having such connectors or fibers and associated circuitry or components, ports provided for monitoring optical spectrum, or for future expansion or reconfiguration, or because the commercially available optical branching components do not provide the desired number of outputs, and so on.

References to access to an optical path are intended to encompass any kind of physical access which could affect optical signals on the optical path, such as connecting to an optical connector or splicing a fiber tail or tapping a proportion of the optical power, so that optical signals on the optical path can be received, or so that interfering optical signals can be added to the optical path.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

By way of introduction to features of embodiments of the invention, some discussion of known features will be presented. Today's ROADM architectures allow nodes with different functionalities such as the Colored/Colorless, Directionless/Directioned, Contentionless, etc. All these architectures show a certain degree of vulnerability in terms of ease of access to optical unused output ports where the optical signal carrying a large amount of traffic can be tapped or accessed and no means of detecting the malicious intrusion are available now.

Some of the vulnerable points of these architectures include:
  Line splitter unused output ports typical of broadcast & select structures
  Passive AWG ports at the drop side
  ADD channels splitter output ports in the directionless architecture
  Splitter output ports in the drop side of the colorless architectures with coherent transponders
  N×M ports in the contention-less architectures.
  Card monitoring ports (e.g. optical amplifier monitors)

Hence there are many unused output ports, unprotected and accessible, available in the current and future node architectures for optical networks, and the current art does not recognise this problem. Reliance is placed on building or room or cabinet security measures. But many customer sites/buildings may not be sufficiently protected against intrusion or access to the equipment so additional means to prevent data access violation are desirable.

The known method of securing of monitoring ports by obscuring the signal in the time domain without altering the optical spectrum is not useful for other types of unused ports from which it's possible to extract the signal for malicious purposes. Unused optical output ports in ROADM nodes can't be protected in this way since the signal can't be distorted.

Furthermore those methods require modifications of existing cards where monitoring ports are present. This hinders use in installed networks. A method that allows an in-traffic upgrade of the network optical security level is therefore desirable. Most of the units showing vulnerable ports are just passive (splitters, AWG filters, etc) and transforming them to active units would be too onerous and not commercially advantageous. Therefore the need for a different approach with broader protection capabilities has been recognised by the present inventors. This can be based on a 'security guard unit' which provides the capacity of a ROADM node to certify that a light-path crossing the node itself has not been spilled, tapped, dropped or interfered with in any way. ROADM architectures show lots of points of 'weakness' and vulnerable points of access for a malicious operator. Currently there is no way for the equipment to detect the access to these many points.

Figure 1:
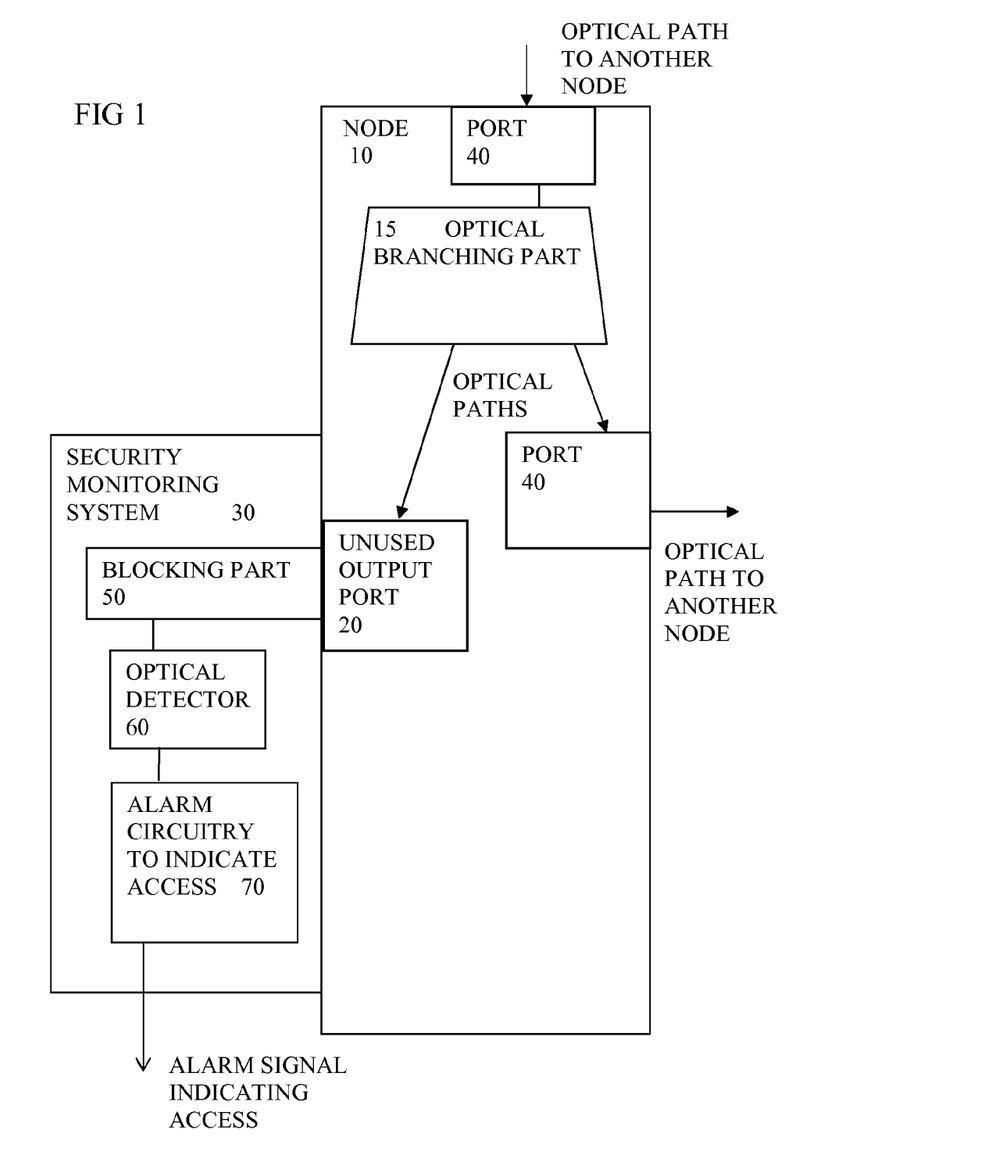
FIG. 1 shows a schematic view of apparatus in the form of a node of an optical network according to a first embodiment
Figure 2:
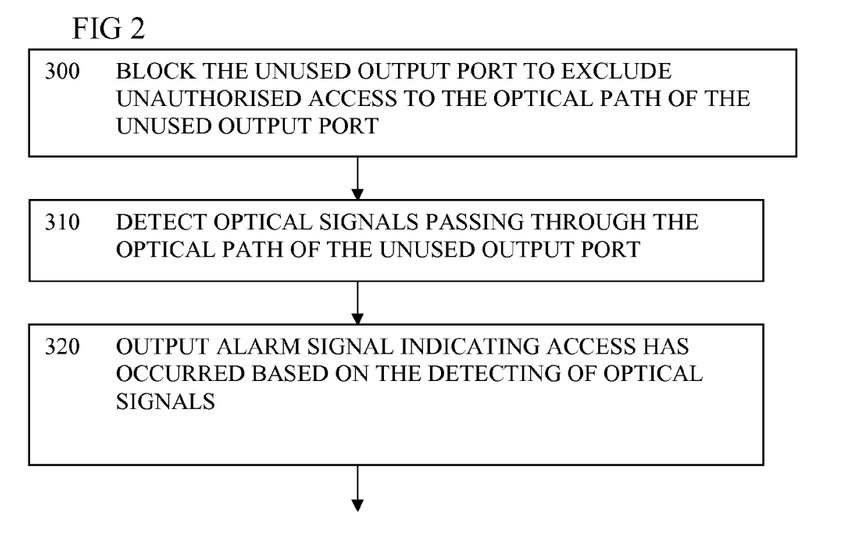
FIG. 2 shows steps in operating a security monitoring system according to an embodiment.

FIGS. 1,2 a First Embodiment of the Invention

FIG. 1 shows a schematic view of apparatus in the form of a node 10 of an optical network with an external security monitoring system 30. The node has ports 40 occupied by links to other ports. An optical branching part 15 is provided in the form of a splitter or demultiplexer for example. Thus there are two or more optical paths. One of these paths leads to an unused output port 20. The system monitoring part has a blocking part 50 which occupies the unused output port so as to prevent unauthorised access to the optical path of the unused output port. An optical detector 60 is provided coupled to the blocking part and configured to detect optical signals passing through the unused port. This can be integrated in the blocking part, or provided with an optical path such as an optical fiber flying lead so that the optical detector can be some meters away from the port. The monitoring system also has alarm circuitry 70 coupled to the optical detector and configured to output an alarm signal indicative that the unused output port has been accessed based on the detecting of the optical signals by the optical detector.

The proposed security monitoring system or guard unit (which can be a card fitted into the main equipment, or an active frame housed in a pizza box likewise) can have optical detectors implemented as a set of photodiodes to be connected to blocking parts in the form of optical connectors for example to connect to the open unsecure ports of a ROADM node. Any opening of such connections for malicious purposes will be instantaneously detected, and an alarm signal can be sent to enable network operators to take opportune counter measures.

This method or apparatus can be applied to current equipment or installed legacy equipment since it can be based on a new add-on unit which does not require changes in the developed equipment cards. Furthermore the unit can be based on low cost devices and simple low speed electronics and control. The idea is pertinent to ITU-T X.805, addressing non repudiation and access control security dimensions, and the security management plane.

If the ROADM has the required security capability, the security monitoring system can communicate this information, for example indicating the security capability and its current status to the network control and management for any appropriate response, such as warning a human operator, or rerouting sensitive traffic, or updating a routing database for example. Note that the security could be enforced for a part of the node capacity of for a subset of the available directions. In this case of multiple parameters it can communicate for which wavelength and/or for which directions the security is available.

The security monitoring system can be implemented as a card or a pizza box unit with a series of optical connections terminated with photodiodes arrays capable of detecting presence or absence of incoming light. In this way the node ports to be protected against access violation are connected to the input ports of the Security Guard Unit and any disconnection will be detected and signalled to higher level of node or network management.

FIG. 2 shows operating steps according to an embodiment such as that of FIG. 1 or other embodiments. At step 300 the unused output port is blocked by the blocking part being coupled to the unused output port. This occupies the port so as to prevent any unauthorised access to the optical path. At step 310, the optical detector detects optical signals passing through the optical path of the unused output port. At step 320, if the detector detects a break in the optical signals, it is inferred that the blocking part has been removed or tampered with in some way and thus that unauthorised access has occurred. An alarm signal is output, and this can be used for any purpose, for example to alert an operator, or to reroute traffic, or to update a routing database.

Some effects and consequences of these features described above are as follows:
  Can protect against unwanted access to unsecure ports of system node architectures.
  Does not require a change in the installed node configuration: the unit can be added on a live network to upgrade a node to a higher level of security.
  No dedicated hardware is required on the traffic card of the nodes.
  It can be applicable to passive units as well as more complex active units.
  Scalable: it is possible to dimension the unit depending on the number of ports/lines one wants to protect.

Low cost: it can be based on low cost hardware with photodiodes, and simple low speed electronics.

Figure 3:
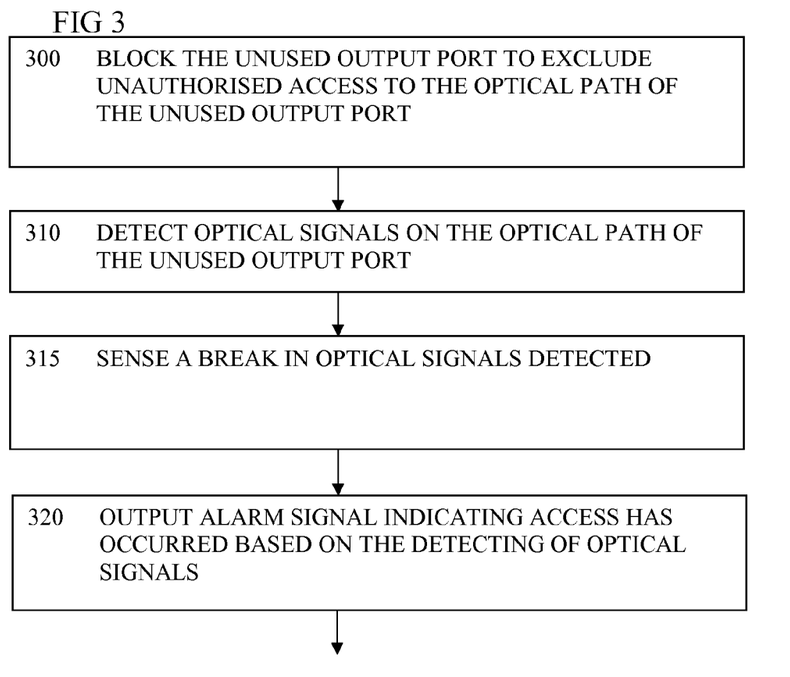
FIG. 3 shows steps in operating a security monitoring system according to an embodiment having monitoring by sensing a break in optical signals.

FIG. 3, Embodiment Monitoring by Sensing Break in Optical Signals

FIG. 3 shows a method similar to that of FIG. 2 and showing some operating steps of the embodiment of FIG. 1 or other embodiment. At step 300, the unused output port is blocked by coupling the blocking part. This occupies the port so as to prevent any unauthorised access to the optical path. At step 310, the optical detector detects optical signals passing through the optical path of the unused output port. At step 315, a break in the optical signals is sensed by the optical detector. At step 320, if the detector detects a break in the optical signals, it is inferred that the blocking part has been removed or tampered with in some way and thus that unauthorised access has occurred. An alarm signal is output, and this can be used for any purpose.

Figure 4:
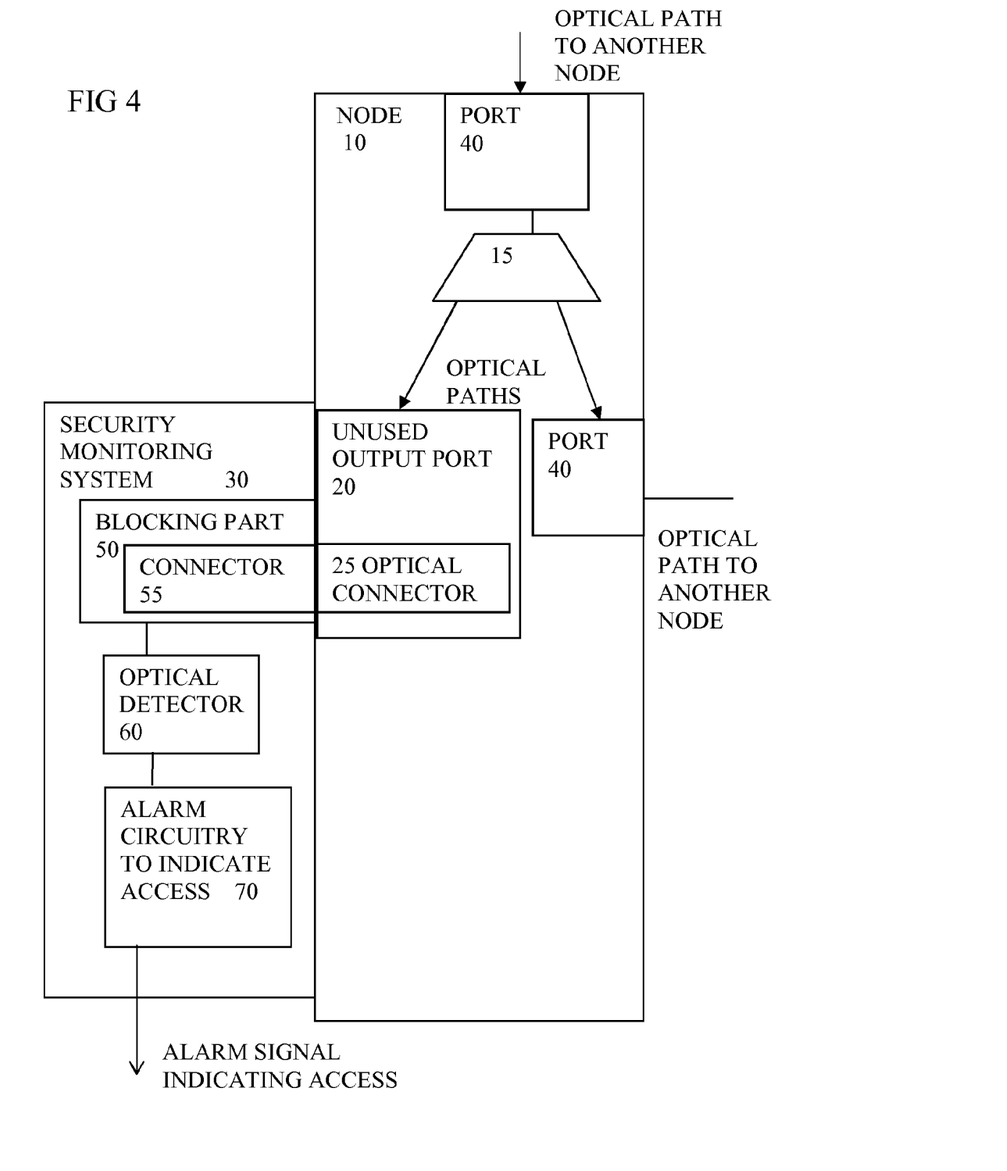
FIG. 4 shows a schematic view of apparatus according to an embodiment having blocking parts for occupying unused optical connectors

FIG. 4 Embodiment Having Blocking Parts for Occupying Unused Optical Connectors

FIG. 4 shows an embodiment similar to that of FIG. 1 and similar reference signs are used for corresponding features. In FIG. 4 the unused output port 20 has an optical connector 25. This is coupled to a corresponding connector 55 of the blocking part, so as to occupy the unused port and prevent any other access to the optical path.

Figure 5:
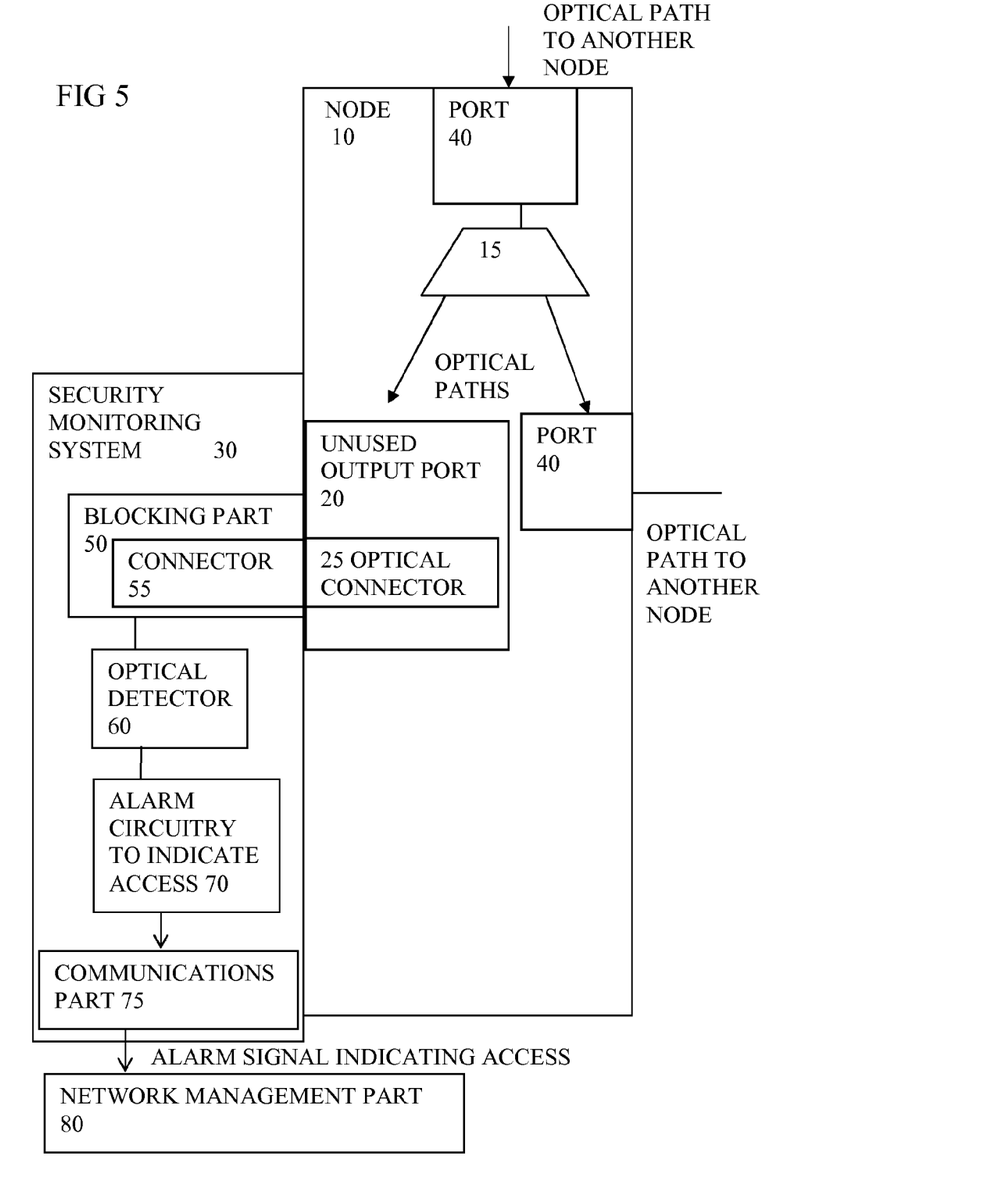
FIG. 5 shows a schematic view of apparatus according to an embodiment having blocking parts for occupying unused optical connectors and a communications part for sending the alarm signal to a network management system.

FIG. 5 Embodiment Having Communications Part for Sending Alarm Signal to NMS

FIG. 5 shows an embodiment similar to that of FIG. 4 and similar reference signs are used for corresponding features. In FIG. 5 the unused output port 20 has an optical connector 25. This is coupled to a corresponding connector 55 of the blocking part, so as to occupy the unused port and prevent any other access to the optical path. The security monitoring system has a communications part 75 so that the output alarm signal can be sent to a network management part 80.

Figure 6:
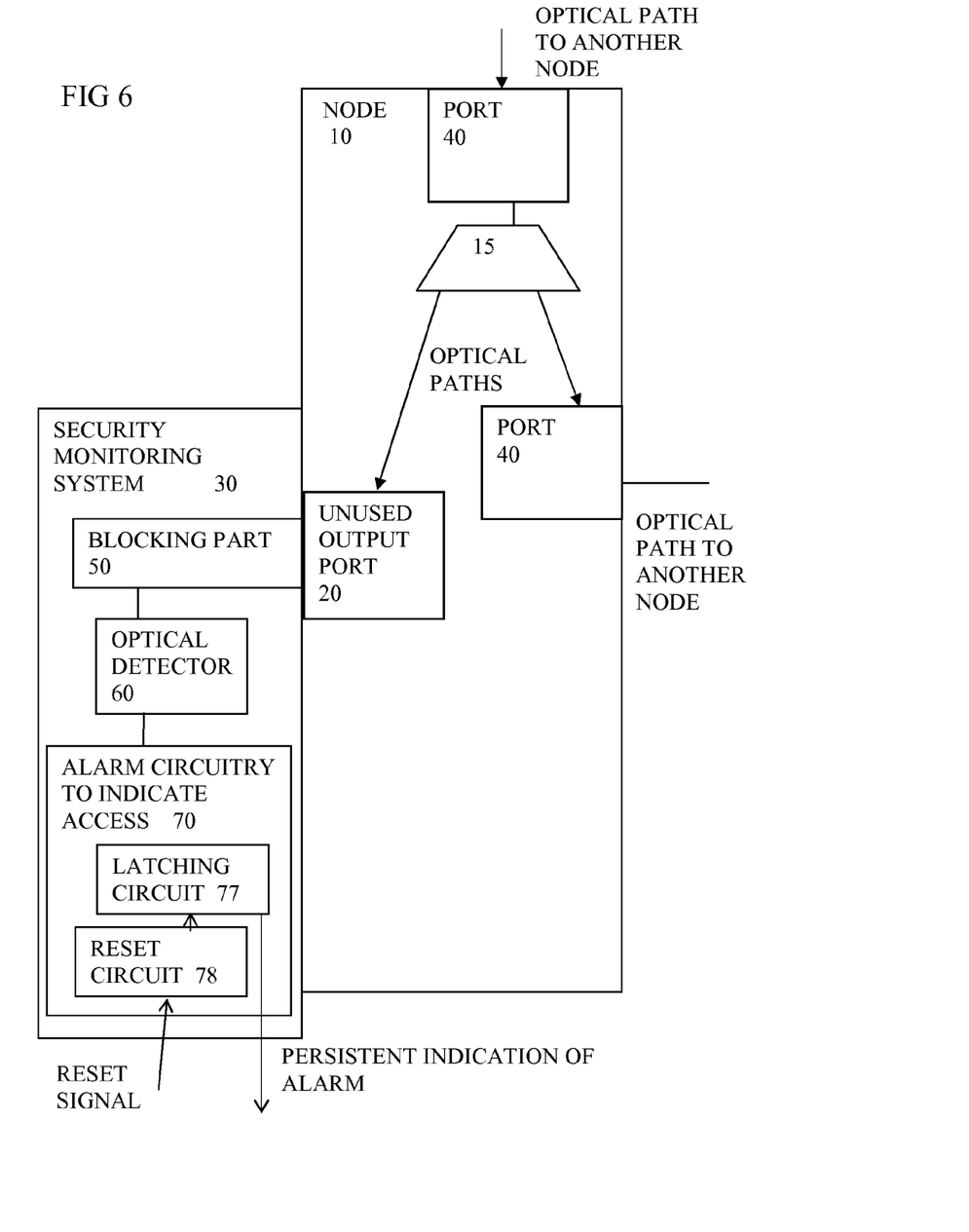
FIG. 6 shows a schematic view of apparatus according to an embodiment having latched alarm signal.

FIG. 6 Embodiment Having Latched Alarm Signal

FIG. 6 shows an embodiment similar to that of FIG. 4 and similar reference signs are used for corresponding features. In FIG. 6 the alarm circuitry 70 has a latching circuit 77 so that a persistent indication of a transient alarm can be output. A reset circuit 78 is provided to reset the latching circuit.

Figure 7:
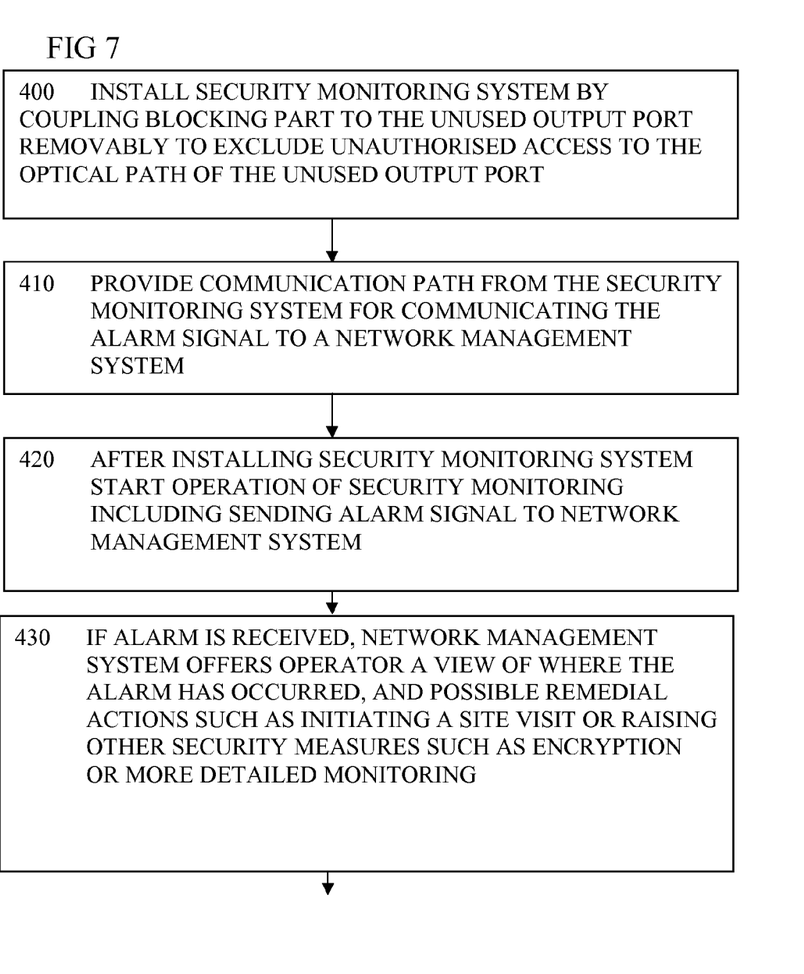
FIG. 7 shows steps in installing a security monitoring system according to an embodiment.

FIG. 7 Installing a Security Monitoring System according to an Embodiment

FIG. 7 shows steps in a method of installing a security monitoring system according to an embodiment. At step 400, the install starts by coupling a blocking part to an unused port of the apparatus, removably, and so as to exclude unauthorised access to the optical path of the unused port. At step 410, a communication path is provided from the security monitoring system for communicating the alarm signal to the network management system. This can be remote from the apparatus, at a centralised location or can be local, for example a software agent of a distributed control plane. In some cases, some configuration inputs may be needed, for example to identify which ports are blocked by which of the blocking parts. At step 420, after installing, operation can start, and the monitoring system can start detecting if there is a break in the signal which would indicate an unauthorised tampering with or removal of the blocking parts. The alarm signal could be sent only when a detection is made, or a signal could be sent periodically to give a positive indication of no detection, or could be sent on request in response to a polling by the management system. At step 430, if an alarm is received, the network management system offers the operator a view on screen indicating where the alarm has occurred and possible remedial actions such as initiating a site visit, rerouting traffic to avoid the location, or raising other security measures such as encryption or more detailed monitoring for example.

Figure 8:
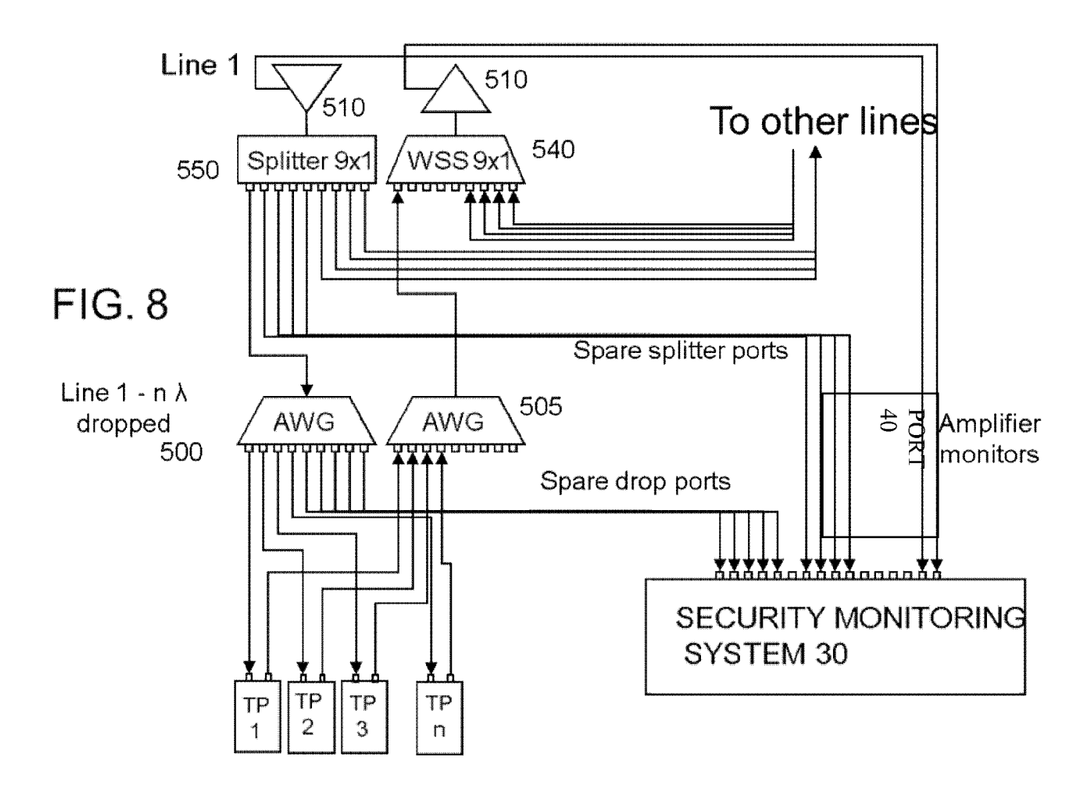
FIG. 8 shows a schematic view of apparatus according to an embodiment in the form of a colored/directional ROADM node.

FIG. 8 Embodiment in the Form of a Colored/Directional ROADM Node

FIG. 8 shows a schematic view of parts of apparatus in the form of a node according to another embodiment in which the security monitoring system is applied to a traditional Colored/Directional ROADM node. One bidirectional optical link (line 1) is shown to and from another node, many other such lines may be provided. Optical amplifiers 510 are provided as input and output interfaces. Monitoring outputs of these amplifiers are fed to the security monitoring system. A splitter 550 splits the incoming optical signal which is typically a WDM signal into 9 identical copies (there may be more or fewer copies in other examples). One of the copies is fed to a drop demultiplexer AWG 500 which separates the n individual wavelengths of the WDM signals and couples each wavelength to a different transponder (TP 1 . . . n) which then outputs an electrical or optical signal to a local client interface. As the AWG may not have the "right" number of outputs to match the desired number of transponders, there may be a number of spare outputs which are unused ports. These are coupled to the security monitoring system so that they are occupied and not vulnerable to unauthorised, undetected eavesdropping.

The splitter has 8 other outputs as shown. Four of these are fed to other lines and so are "used". Another four are unused and so are fed to the security monitoring system so that they are occupied and not vulnerable to unauthorised, undetected eavesdropping. Hence the security monitoring system as shown occupies all the unused monitoring ports, unused splitter ports, and unused demultiplexer drop ports.

The transponders also have incoming signals which are for adding to the WDM signals sent to the other nodes. These are coupled as individual wavelengths from the transponders to AWG multiplexer 505. The WDM "add" signal from multiplexer 505 is fed to a WSS 540 which selects which wavelengths of the "add" signal are sent out on line 1 together with other wavelengths from other lines. The output WDM signal from WSS 540 is fed to an optical amplifier 510 for transmission to the next node. Parts 510, 550 and 540 can be provided for each of the lines served by the node.

If all the unused output ports for a given incoming line are occupied and monitored, this can provide a security capability for that line even if other lines incoming to the same node do not have the same security. The security monitoring system can be arranged to indicate to the network management system which of the lines are secure.

Or, in another example, a subset of the wavelengths can be protected by occupying all the unused monitoring ports, all the unused splitter ports, but only selected ones of the drop ports corresponding to the subset of wavelengths. The security monitoring system can be arranged to indicate to the network management system which of the wavelengths are secure.

Or, if desired, all the unused output ports of the entire node can be occupied and monitored by the security monitoring system. Furthermore, if other points of vulnerability need to be protected, such as manual configuration switches or input ports, if they are physically close to a protected unused output port then the blocking part can be manufactured so as to cover such other points of vulnerability when in position occupying the unused output port. This is better than having separate covers for these other points of vulnerability since there is no need for separate monitoring of tampering of such separate covers.

Figure 9:
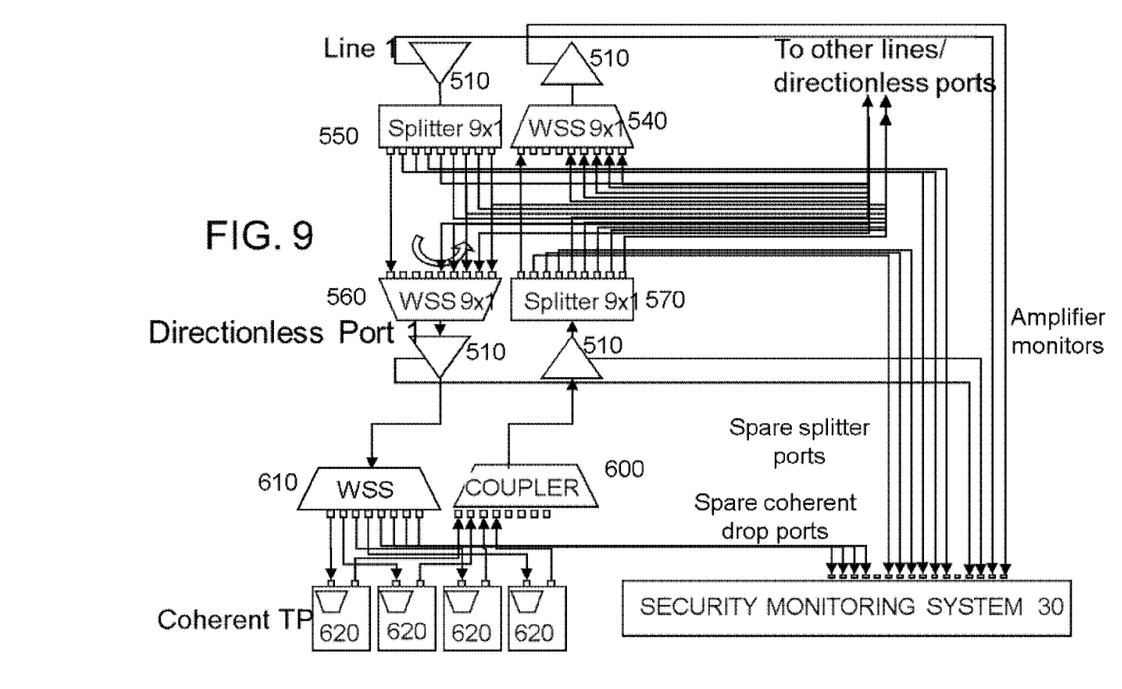
FIG. 9 shows a schematic view of apparatus according to an embodiment in the form of a colored/directional ROADM node.

FIG. 9 Embodiment in the Form of a Colorless/Directionless ROADM Node

FIG. 9 shows a schematic view of parts of apparatus in the form of a node according to another embodiment in which the security monitoring system is applied to a more advanced colorless/directionless architecture. As in FIG. 8, one bidirectional optical link (line 1) is shown to and from another node, many other such lines may be provided. Optical amplifiers 510 are provided as input and output interfaces. Monitoring outputs of these amplifiers are fed to the security monitoring system. A splitter 550 splits the incoming optical signal which is typically a WDM signal into 9 identical copies (there may be more or fewer copies in other examples). One of the copies is fed to an input of WSS 560 of a directionless port 1. Here the WSS 560 selects wavelengths from the WDM inputs from all of the lines and feeds the resulting WDM signal to an optical amplifier 510 then to a WSS 610 where the wavelengths of the WDM signal are selected for output to different coherent transponders 620 which can select from or process the multiple wavelengths. There can be cascaded splitters to provide for more transponders As in FIG. 8 there may be a number of spare outputs of the splitter 550 which are unused ports, not coupled to other lines. These are shown coupled to the security monitoring system so that they are occupied and not vulnerable to unauthorised, undetected eavesdropping. Also there are a number of spare outputs of the WSS 610 which can be unused coherent drop ports. These are all shown coupled to the security monitoring system. There are also monitoring ports from the optical amplifiers which are also unused and so are also occupied and monitored by the security monitoring system and not vulnerable to unauthorised, undetected eavesdropping. Hence the security monitoring system as shown occupies all the unused monitoring ports, unused splitter ports, and unused demultiplexer drop ports.

The transponders also have incoming signals which are for adding to the WDM signals sent to the other nodes. These can have selectable wavelengths or multiple wavelengths, generated at the coherent transponder. These are combined by a coupler 600 instead of the wavelength multiplexer shown in FIG. 8, assuming that the different inputs do not have overlapping wavelength allocations. Before the coupler 600 there can be a splitter (not shown) to enable the transponders to distribute their incoming signals to other directionless ports within the node. The resulting WDM signal output by the coupler 600 is fed to a splitter 570 via an optical amplifier 510. The outputs of the splitter are distributed to different ones of the lines. One of them is shown passing to line 1, to an input of WSS 540. This part selects wavelengths from different lines and ports, for output on line 1. There are more outputs of splitter 570 than there are lines and thus three spare outputs are unused output ports which are shown as being occupied by the security monitoring system.

Several implementations could be adopted, according to node needs and the system architecture. Possible differentiations will be the space and mechanical requirement to manage the connection of all monitor points. Using a slide-in unit it is reasonable to foresee a limit of up to 40~48 LC connections for a 15 inches single slot card. A pizza-box approach could reach about 80~100 LC connections on a single Rack Unit solution. A possibility to increase the density is to use MTP connectors together with "Hydra" cables, but this will add costs to the solution.

The security monitoring system can have a relatively simple design. It can be a stand alone box, or be implemented as a module to be inserted into the node for example. It can have a photodiode array with control electronics to be able to detect the LOS condition, once the connection is open. A simpler solution could use just a comparator (analog) or, introducing some AD components, it will be possible to manage different threshold for each port. The use of a microcontroller with dedicated SW allows alarm management and communication with the Network Equipment.

A basic solution could consist of all monitored entities connected by a logical OR wired to a ground contact of the equipment. This would only raise a node access alarm, without indication of the specific port, but could be added without specific development/upgrade on the existing equipment (only the logical assignment of the used ground contact with a security alarm is needed).

Depending on the node architecture, different number of monitoring points may be required. For a fully colourless and directionless solution, based on a broadcast and select architecture (majority of installed WSS based nodes) a limited number of open unprotected ports need to be managed: the unused line and add port of the splitters plus the amplifier monitor ports. A solution with 8~16 monitors could fit the requirement. For more complex nodes such as those with fixed non directionless add/drop, they will also have all the free ports of the AWG demux (or other demux technology) to be monitored, since the node pass-through channel will be split and be present at the corresponding demux port. A solution with several tens of monitors may be preferred in these conditions.

Figure 10:
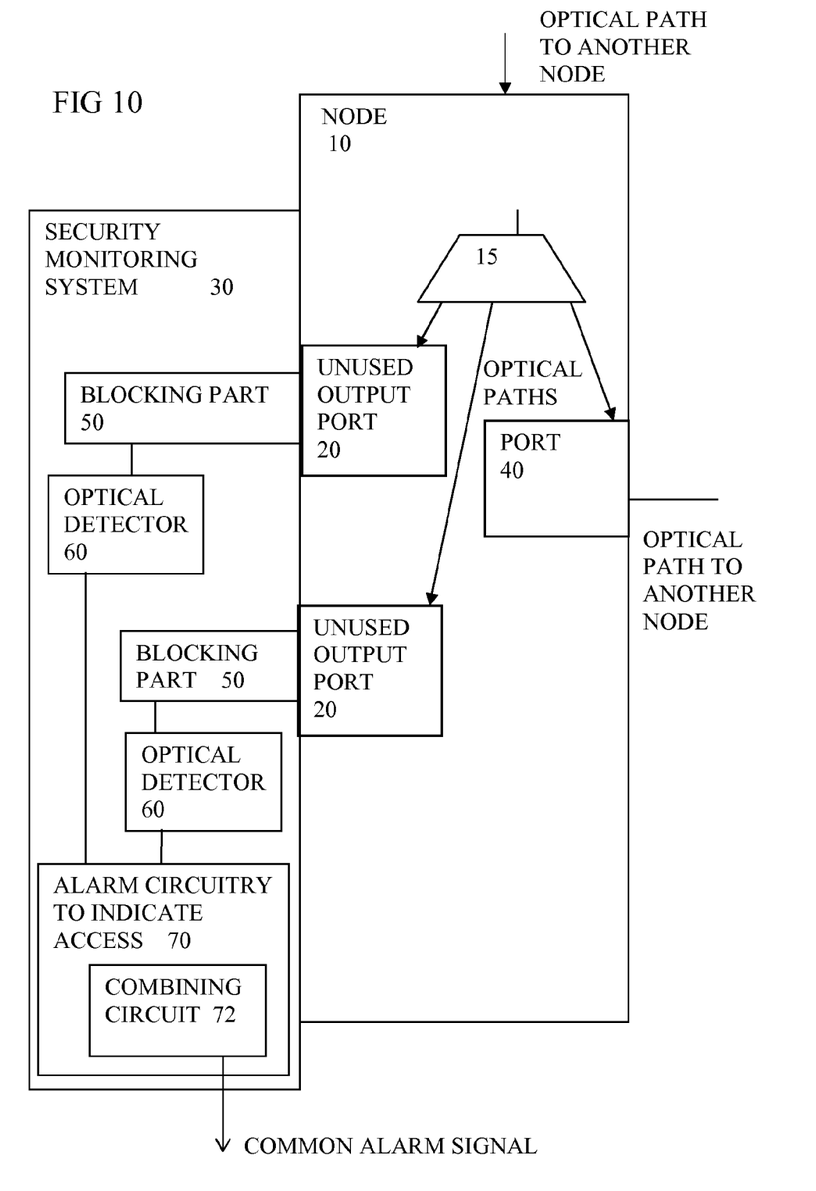
FIGS. 10 and 11 show schematic views of apparatus having features in their alarm circuitry.
Figure 11:
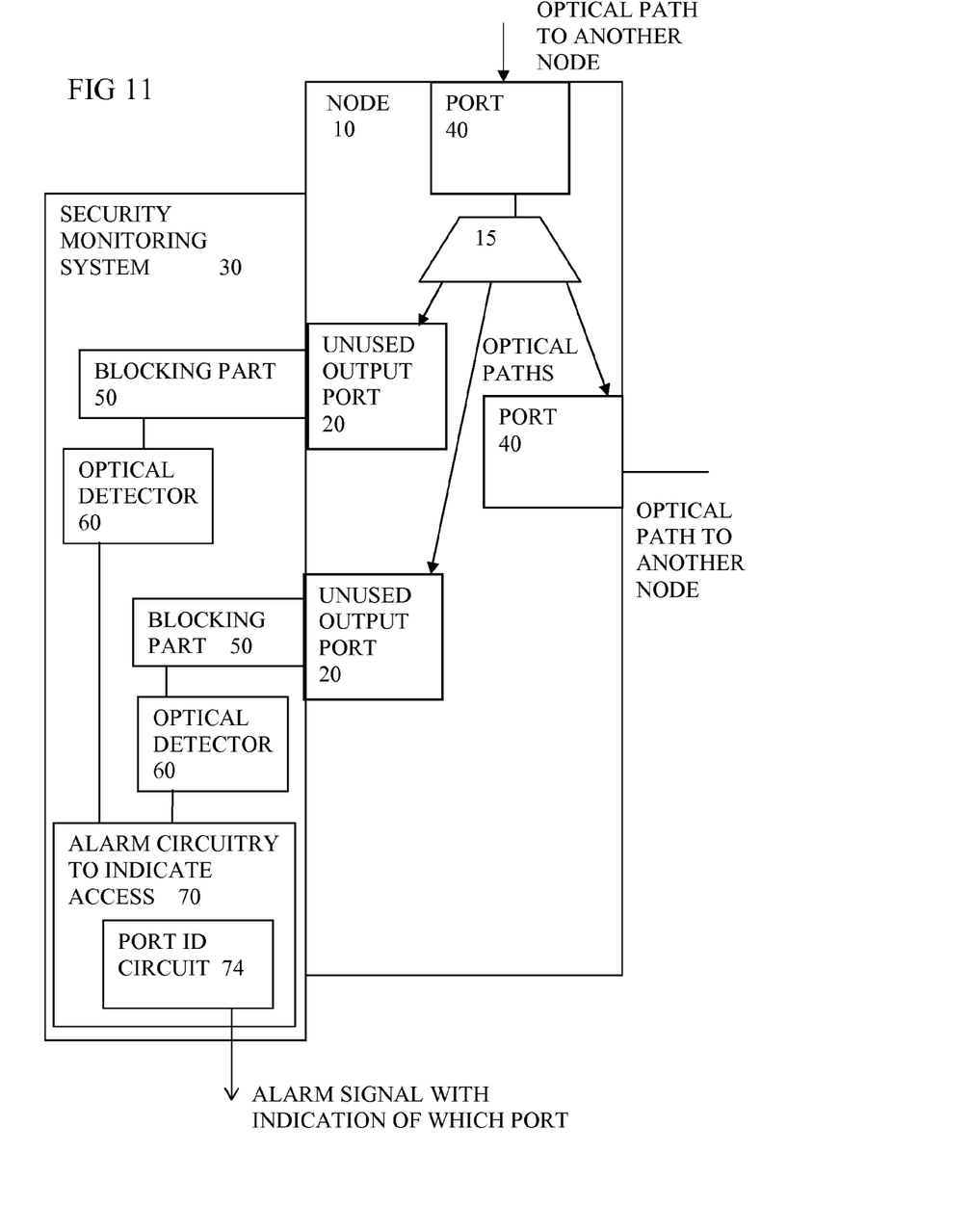

FIGS. 10 and 11 Embodiments of Apparatus Having Features in Their Alarm Circuitry.

FIGS. 10 and 11 show embodiments having particular features in the alarm circuitry. FIG. 10 shows an embodiment similar to that of FIG. 1, and having multiple unused output ports and corresponding blocking parts. Two are shown but there can of course be many more. The alarm circuitry has a combining circuit 72 for combining signals from different blocking parts. This could be a simple logical OR circuit so that an alarm is sent if any of the blocking parts are tampered with.

FIG. 11 shows an embodiment similar to that of FIG. 10, again having multiple unused output ports and corresponding blocking parts. But in place of the combining circuit 72 the alarm circuitry has a port ID circuit 74. This enables an alarm signal to be sent if any of the blocking parts are tampered with, but in this case an indication of which port has triggered the alarm is sent. This can be implemented in various ways, one of which involves using a look up table for example. The look up table can be addressed by the incoming signals from the optical detectors, and can output a port ID number. These numbers can be set up at the time of installing the blocking parts, and can be stored in non volatile memory.

Other variations and embodiments can be envisaged within the claims.

The invention claimed is:

1. An apparatus for an optical communications network, the apparatus comprising:
  at least two optical paths for optical traffic to or from other nodes, the optical paths having respective optical ports, wherein at least one of the optical ports is configured as an unused output port, available for future use for optical traffic, and
  a security monitoring system for detecting unauthorised access, the system comprising:
  a blocking part coupled removably to the unused output port to occupy the unused output port so as to exclude any other part from using the unused output port to gain unauthorised access to the optical path of the unused output port;

an optical detector coupled to the blocking part and configured to detect optical signals passing through the unused output port and to detect a break in the optical signals; and alarm circuitry configured to output an alarm signal indicative that the unused output port has been accessed based on the detecting of the break in the optical signals by the optical detector.

2. The apparatus of claim 1, wherein the alarm circuitry is configured to output the alarm signal if a break in the optical signals is sensed.

3. The apparatus of claim 1, comprising at least one of an optical splitter having an output coupled to the unused output port, and a wavelength demultiplexer having an output coupled to the unused output port.

4. The apparatus of claim 1, wherein:

the at least one unused output port comprises an optical connector, and the blocking part has a corresponding connector suitable to mate with the optical connector to couple the optical path of the unused output port with the optical detector.

5. The apparatus of claim 1, wherein the monitoring system has a communications part for sending the alarm signal to a network management part of the network.

6. The apparatus of claim 1, wherein the alarm circuitry has a latching circuit configured to maintain a persistent indication of a temporary detection of tampering, and a reset circuit for resetting the latching circuit according to an external signal.

7. A security monitoring system for coupling to an unused output port of an optical path of apparatus of an optical network, the apparatus having at least two optical paths for optical traffic to or from other nodes, the optical paths having respective optical ports, wherein at least one of the optical ports is configured as an unused output port, available for future use for optical traffic, the security monitoring system being for detecting unauthorised access and comprising:

a blocking part for coupling with the unused output port so as to occupy the unused output port;

an optical detector coupled to the blocking part and configured to detect optical signals passing through the unused output port and to detect a break in the optical signals; and alarm circuitry configured to output an alarm signal indicative that the unused output port has been accessed, based on the detecting of the break in the optical signals by the optical detector.

8. The security monitoring system of claim 7, wherein the alarm circuitry is configured to output the alarm signal if a break in the optical signals is sensed.

9. The security monitoring system of claim 7, comprising a communications part for sending the alarm signal to a network management part of the network.

10. The security monitoring system of claim 7, wherein the alarm circuitry has a latching circuit configured to maintain a persistent indication of a temporary detection of tampering, and a reset circuit for resetting the latching circuit according to an external signal.

11. The security monitoring system of claim 7, comprising two or more blocking parts, for two or more respective unused output ports and wherein the alarm circuitry is configured to output an alarm signal indicating which of the two or more unused output ports has been accessed.

12. The security monitoring system of claim 7, comprising two or more blocking parts, for two or more respective unused output ports and wherein the alarm circuitry is configured to combine outputs of the optical detectors to output a common alarm signal if access to any of the two or more unused output ports is detected.

13. A method of monitoring security of an optical path to detect unauthorised access to the optical path in an apparatus of an optical network, the apparatus having at least two optical paths for optical traffic to or from other nodes, the optical paths having respective optical ports, wherein at least one of the optical ports is configured as an unused output port, available for future use for optical traffic, the method comprising:

blocking the at least one unused output port so as to exclude any other part from using the unused output port to gain unauthorised access to the optical path of the unused port;

detecting optical signals on the optical path of the unused output port;

detecting a break in the optical signals; and outputting an alarm signal indicating whether access has occurred based on the detecting of the break in the optical signals by the optical detector.

14. The method of claim 13 comprising:

sensing if a break in the optical signals is detected, and outputting the alarm signal according to the sensing.

15. The method of claim 13, comprising:

sending the alarm signal to a network management part of the network.

16. A method of installing a security monitoring system to upgrade an apparatus of an optical communications network, the method of installing the security monitoring system comprising:

coupling a blocking part of the security monitoring system to an unused output port of the apparatus; and providing a communication path for alarm circuitry of the security monitoring system to communicate an alarm signal to a network management system of the network, wherein:

the apparatus has at least two optical paths for optical traffic to or from other parts of the optical communication network, and has two or more optical ports, wherein at least one of the optical ports is configured as the unused output port, available for future use for optical traffic; and the security monitoring system is for detecting unauthorised access to the unused output port and has the blocking part suitable to couple removably to the unused output port to occupy the unused output port so as to exclude any other part from using the unused output port to gain unauthorised access to the optical path of the unused output port;

an optical detector coupled to the blocking part and configured to detect optical signals passing through the unused output port and to detect a break in the optical signals; and alarm circuitry configured to output the alarm signal indicative that the unused output port has been accessed based on the detecting of the break in the optical signals by the optical detector.

* * * * *